United States Patent Office 2,929,824
Patented Mar. 22, 1960

2,929,824
BETA-SUBSTITUTED SULFENATE ESTERS

Norman Kharasch, Culver City, and Robert B. Langford, Los Angeles, Calif., assignors, by direct and mesne assignments, to Stauffer Chemical Company, a corporation of Delaware No Drawing. Application December 13, 1956
Serial No. 627,991
18 Claims. (Cl. 260—348)

This invention relates to the manufacture of sulfenate esters and particularly to the manufacture of beta-substituted sulfenate esters.

We have found that beta-substituted sulfenate esters can be produced by interaction of a 1,2-epoxide with a sulfenyl derivative, according to general Equation 1,

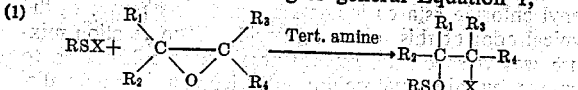

where RSX is a sulfenyl chloride, a sulfenyl bromide, a sulfenyl thiocyanate or other sulfenyl derivative, such as a sulfenyl acetate, RS—OCOCH$_3$, or a sulfenic anhydride, RSOSR; and the olefin oxide is one of a large number of such substances, as exemplified by ethylene oxide, propylene oxide, the isomeric butylene oxides, styrene oxide, epichlorohydrin or cyclohexene oxide.

The general reaction shown above provides a novel and useful procedure for the synthesis of a wide variety of substituted sulfenate esters. In accord with the required stoichiometry, a suitable aromatic or aliphatic sulfenyl derivative is reacted with an equal molar quantity of a 1,2-epoxide.

We have found that the use of an appropriate catalyst is highly advantageous in driving Reaction 1 to completion. For example, by employing a tertiary amine, such as pyridine, the reaction rate is promoted, while the acidic hydrolysis of the product ester that might otherwise occur is prevented by the presence of the amine. Only a trace of the catalyst is required; and, for practical purposes, 0.01 to 0.05 mole of the catalyst for each mole of the sulfenyl chloride and epoxide is generally sufficient to permit the reaction to go to completion, in reasonable time, at room temperature or with only gentle heating. In place of pyridine, other amines such as triethylamine or 2-methyl-5-ethylpyridine, are also suitable catalysts for Reaction 1. The utility of these is somewhat surprising in view of the report of Moore and Johnson [J. Am. Chem. Soc., 57, 1517 (1935)] that sulfenyl halides react with dry pyridine to form disulfides; but it seems likely that the catalytic effect occurs through formation of a pyridine-sulfenyl complex, such as has been discussed by Goodman and Kharasch [J. Am. Chec. Soc., 77, 6541 (1955)] in the reactions of sulfenyl halides with alcohols. An excess of the catalyst can be used without disadvantage, but precautions should be taken to avoid the hazards which attend the sudden release of extensive heat if Reaction 1 proceeds too rapidly.

The following examples illustrate the practice of our invention for the case where the sulfenyl derivative is 2,4-dinitrobenzenesulfenyl chloride.

*Example 1.—General procedure for the reaction of 1,2-epoxides with 2,4-dinitrobenzenesulfenyl chloride in the presence of pyridine.*—Into a small flask, there was placed 0.50 g. (0.002 mole) of 2,4-dinitrobenzenesulfenyl chloride and 5 ml. of dry ethylene chloride. Each of the epoxides (0.025 mole) of Table I was added, followed by 3 or 4 drops of pyridine. The flask was stoppered and let stand overnight, at room temperature, in the dark. Completion of the reaction was indicated by a negative starch-iodide test for the sulfenyl chloride. The yellow or red solution was diluted with methylene chloride and poured onto a silica column. Washing the column with methylene chloride removed a yellow band, and left a red band (in all cases) on the column. The insoluble bis(2,4-dinitrophenyl)disulfide was mechanically filtered by the column. The yellow eluate was evaporated to dryness and the residue was recrystallized from methylene chloride-petroleum ether (B.P. 32–36°) to give the products listed in Table I.

The structures of the products of Table I are arrived at by analysis, by consideration of the most probable mechanism of the reaction [Peters and Kharasch, J. Org. Chem., 21, 590 (1956)], and especially by alternate synthesis of selected examples, via the reactions of the appropriate chlorohydrins and the sulfenyl chloride. Thus, as shown in Table I, the identical product was obtained either from ethylene oxide and 2,4-dinitrobenzenesulfenyl chloride, or from reaction of 2-chloroethanol (ethylene chlorohydrin) and 2,4-dinitrobenzenesulfenyl chloride. Similarly, either propylene oxide or 1-chloro-2-propanol gave the same product, in the reaction with 2,4-dinitrobenzenesulfenyl chloride. The general procedure used to prepare the products of Table I can also be applied to other sulfenyl derivatives. Thus, it may be used with 2-nitro-4-chlorobenzenesulfenyl chloride, 2-nitrobenzenesulfenyl chloride, 2,4-dinitrobenzenesulfenyl bromide, 2,4-dinitrobenzenesulfenyl thiocyanate, 2,4-dinitrobenzenesulfenyl acetate, and, as shown below, in detail, with trichloromethanesulfenyl chloride (Cl$_3$CSCl).

TABLE I

Synthesis of β-chloroalkyl 2,4-dinitrobenzenesulfenates from 2,4-dinitrobenzenesulfenyl chloride (IQ and 1,2-epoxides or chlorohydrins

| Epoxide or Chlorohydrin | Product (Ar=2,4-dinitrophenyl) | Yield,[a] Percent | M.P., °C. | Unreacted I in absence of pyridine, Percent | Analyses Calc'd | | | Analyses Found | | |
|---|---|---|---|---|---|---|---|---|---|---|
| | | | | | C | H | N | C | H | N |
| Ethylene oxide | ClCH$_2$CH$_2$OSAr | 50 | 120–121 | 85 | 34.53 | 2.53 | 10.07 | 34.45 | 2.55 | 9.87 |
| 2-Chloroethanol | | 80 | 121–122 | | 34.53 | 2.53 | 10.07 | 34.83 | 2.76 | 10.07 |
| Cyclohexene oxide | C$_6$H$_{10}$ClOSAr | 78 | [b]140–145 | 95 | 43.30 | 3.90 | 8.40 | 43.43 | 4.16 | 8.53 |
| trans-2-Chlorocyclohexanol | | 80 | [b]140–145 | | 43.30 | 3.90 | 8.40 | 43.02 | 4.13 | 8.28 |
| Propylene oxide | CH$_3$(ClCH$_2$)CHOSAr[c] | 30 | 106–107 | 95 | 36.86 | 3.07 | 9.55 | 36.91 | 3.24 | 9.79 |
| 1-Chloro-2-propanol | | 55 | 106–107 | | 36.86 | 3.07 | 9.55 | 36.55 | 3.14 | 9.25 |
| Styrene oxide | Yellow oil[d] | | | | 47.32 | 3.10 | 7.90 | 47.80 | 3.37 | 7.55 |
| 2-Chloro-2-phenylethanol | Yellow oil | 45 | | | | | | | | |
| 2-Chloro-1-phenylethanol | C$_6$H$_5$CH(OSAr)CH$_2$Cl | 30 | 121–122 | 85 | 47.32 | 3.10 | 7.90 | 47.33 | 3.20 | 7.74 |
| Stilbene oxides (cis and trans) | No reaction | | | [e]95 | | | | | | |

[a] The yields are based on the amounts of 2,4-dinitrobenzene-sulfenyl used.
[b] The products melt, with decomposition and darkening, in the temperature range indicated.
[c] From the unsymmetrical oxides, the crude products probably contained both isomeric sulfenate esters.
[d] The analytical sample showed definite signs of crystallizing, but could not be induced to do so completely.
[e] From the trans oxide.

Some of the low yields in Table I are undoubtedly caused by traces of moisture present in the reactants and by the fact that the reactions were conducted on a small scale, which makes recovery of product in full amount somewhat more difficult. That hydrolysis is also involved, however, was shown by the occurrence of the well-known and highly insoluble bis(2-4-dinitrophenyl) disulfide—probably by the mechanism described by Kharasch, King, and Bruice, J. Am. Chem. Soc., 77, 931 (1955). Undoubtedly, further precautions in the drying of reagents and scaling up of the runs would improve the yields.

The reaction of 1,2-epoxides is easily illustrated by use of 2,4-dinitrobenzenesulfenyl chloride as the sulfenyl halide because the excellently crystalline products from this sulfenyl chloride lend themselves to easy isolation and characerization. It is also for this reason that the reaction of 1,2-epoxides with 2,4-dinitrobenzenesulfenyl chloride may be recommended for the identification of certain olefin oxides, through the characteristic melting points of the products [cf., also, Kharasch, J. Chem. Ed., 33, 585, 1956]. In some cases, however, with unsymmetrical 1,2-epoxides, mixture of products may result, and these latter mixtures may be oils, rather than crystalline solids. This was observed, for example, in the reaction of 2,4-dinitrobenzenesulfenyl chloride with styrene oxide. In this instance, the product was a yellow oil, which gave the correct elementary analysis for the desired reaction product, but which undoubtedly contained a mixture of both possible products shown below (ar=2,4-dinitrophenyl).

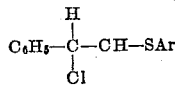

and

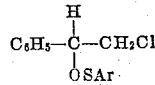

*Example 2.—Alkyl derivatives.*—The derivatives of trichloromethanesulfenyl chloride, an aliphatic sulfenyl chloride, have shown particularly valuable utilities in a number of applications. It was therefore considered that beta-chloroalkyl esters of trichloromethanesulfenic acid, such as could be obtained via reactions of trichloromethanesulfenyl chloride and 1,2-epoxides (according to the reaction of Equation 1), would be of special interest and it is these which are cited as examples to illustrate our invention. The choice of trichloromethanesulfenyl chloride was also made because of its ready availability and the special interest which attaches to reactions of substances which can decompose by free-radical paths to yield trichloromethyl free radicals, a behavior especially to be anticipated in the reactions of compounds of structure $Cl_3CS$—OR, which should have thioperoxidic characteristics. Accordingly, suitable conditions were sought, and found, for carrying out the reaction of trichloromethanesulfenyl chloride ($Cl_3CSCl$) with a series of 1,2-epoxides. Again, pyridine was found to be a successful catalyst, but the commercially available and less-expensive 2-methyl-5-ethylpyridine or triethylamine were also successfully employed. In the absence of catalyst, certain of these reactions scarcely proceeded at all, but catalytic amounts (1 to 5%, by molar proportion to the sulfenyl chloride) of the tertiary amine served to drive the reaction to completion in reasonable lengths of time and at low temperatures. The following illustrate the synthesis of a series of beta-chloroalkyl trichloromethanesulfenates, by reactions of trichloromethanesulfenyl chloride and selected olefin oxides.

One and one-tenth mole (103 g.) of epichlorohydrin and one mole (186 g.) of trichloromethanesulfenyl chloride were mixed, using 100 ml. of ethylene chloride as the reaction diluent. No apparent reaction was observed on mixing these components. Dry pyridine (3 ml.) was added and the reaction mixture was heated gently (ca. 50° C.) for two hours, then permitted to stand overnight. The following day, completion of reaction was ascertained by a negative test for trichloromethanesulfenyl chloride (starch iodide test) and the absence of the typical odor of this sulfenyl chloride. The reaction mixture was washed with several portions of cold water, to remove pyridine hydrochloride, dried, and vacuum distilled. The desired product was a colorless liquid, of pungent odor, which was obtained in 76% yield of theory and which boiled at 75–76° at 0.2 mm. pressure. The index of refraction ($n_D^{20}$) was 1.5321.

*Analysis.*—Calc'd. for $C_4H_5Cl_5OS$: C, 17.2; H, 1.79; S, 11.5; Cl, 63.7. Found: C, 17.0; H, 1.50; S, 11.6; Cl, 63.7.

The structure of the product was confirmed by alternate synthesis of the identical material from 1,3-dichloro-2-propanol and trichloromethanesulfenyl chloride. The infrared spectra of the products from either route were identical, as were also the boiling points and visual characteristics. The tendency of the product to explode during combustion analysis was noted, but a satisfactory analysis was obtained by slow burning of the sample absorbed on barium sulfate.

*Example 3.*—Procedures similar to that of Example 2 were used to prepare several other trichloromethanesulfenate esters. The olefin oxides which were successfully employed in these reactions with trichloromethanesulfenyl chloride were ethylene oxide, propylene oxide, butene-1-oxide, butene-2-oxide, isobutylene oxide, and styrene oxide. The structures of the products are shown in Table II. The correctness of the assigned structures was confirmed by elementary analyses, infrared analyses, and alternate synthesis. For example, in the case of the product from ethylene oxide, the same substance

was obtained by reaction with ethylene chlorohydrin; and the product from propylene oxide was almost entirely

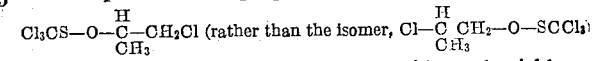

since the product from propylene oxide and trichloromethanesulfenyl was the same as that obtained by reaction of the sulfenyl chloride and 1-chloro-2-propanol.

TABLE II

*Examples of beta-chloroalkyl-trichloromethanesulfenate esters*

| Epoxide | Product | Yield, Percent | B.P., ° C./mm | $n_D^{20}$ |
|---|---|---|---|---|
| Ethylene Oxide | $ClCH_2CH_2OSCCl_3$ | 85 | 45.0–46.0/0.15 | 1.5233 |
| Propylene Oxide | $CH_3(ClCH_2)CHOSCCl_3$ [a] | 81 | 49.5–50.5/0.15 | 1.5122 |
| Epichlorohydrin | $(ClCH_2)_2CHOSCCl_3$ [b] | 76 | 75.0–76.0/0.2 | 1.5321 |
| Butene Oxides [d] | $ClC_4H_8OSCCl_3$ | 85 | 51.0–52.0/0.15 | 1.5095 |
| Styrene Oxide | $C_6H_5CH(CH_2Cl)OSCCl_3$ [c] | 74 | 119.0–121.0/0.12 | 1.5720 |

[a] *Analysis.*—Calc.: C, 19.67; H, 2.45. Found: C, 19.21; H, 2.24%.
[b] *Analysis.*—Calc.: C, 17.2; H, 1.79; S, 11.5; Cl, 63.7. Found: C, 17.02; H, 1.50; S, 11.65; Cl, 63.72%.
[c] *Analysis.*—Calc.: C, 35.4; H, 2.61; S, 10.43. Found: C, 35.55; H, 2.57; S, 10.18; Cl, 46.02%.
[d] Mixed isomers.

All of the new thioperoxides obtained from the olefin oxides and trichloromethanesulfenyl chloride were dense liquids, colorless when pure (but tending to become yellow when exposed to light) and having indices of refraction ($n_D^{20}$) of about 1.5.

The utility of a catalyst is clearly shown in the preparation of the products of Table II.

*Example 4.*—A specific example of the syntheses of Example 3 is illustrated by the case of reaction of ethylene oxide and trichloromethanesulfenyl chloride.

One mole (186 g.) of trichloromethanesulfenyl chloride was dissolved in 100 ml. of dry ethylene chloride. The mixture was cooled to 0–5°, and to it was added slowly 1.1 mole (48.4 g.) of ethylene oxide, dissolved in 50 ml. of ethylene chloride. The reaction flask was fitted with a cold-finger condenser and the mixture was stirred, while adding 3 ml. of pyridine. The clear solution was left for about 15 hours, at room temperature, at which time the test for the sulfenyl chloride was negative. The mixture was then washed with water, to remove the pyridine, dried with anhydrous sodium sulfate, the solvent and excess olefin oxide were distilled at 0.15 mm. pressure (B.P. 45–56°); yield, 85%. The product was identical with the one obtained by reaction of trichloromethanesulfenyl chloride and 2-chloroethanol.

*Analysis.*—Calcd. for $C_3H_4Cl_4OS$: C, 15.65; H, 1.74; Cl, 61.03; S, 13.9. Found: C, 16.53; H, 1.59; Cl, 60.57; S, 13.05.

This product exploded several times during attempts to carry out the combustion analyses. In the carbon-hydrogen determinations, it was found necessary to dilute the samples with barium sulfate. Repeated analyses did not improve the carbon value found in the product.

*Example 5.*—The reaction of Example 4 was carried out precisely as described above, except that the addition of pyridine was omitted. The test for unreacted sulfenyl chloride (cf. Kharasch and Wald, Anal. Chem., 27, 996 (1955)) remained strongly positive. After keeping the reaction mixture for twelve days in a sealed flask, at room temperature, the mixture was fractionally distilled. There was recovered 178 g. (0.95 mole) of trichloromethanesulfenyl chloride. Further evidence that essentially no reaction had occurred after the twelve day period lies in the fact that the distillate gave no evidence of any component boiling in the range to be expected for the 2-chloroethyl trichloromethylsulfenate (cf. Example 3).

USES OF THE PRODUCTS

The utilities of the beta-chloroalkyl trichloromethanesulfenate esters as agricultural chemicals was investigated.

(a) *As fungicides.*—2-chloroethyl trichloromethanesulfenate (the product from ethylene oxide) effectively killed *S. fructicola* at 5 p.p.m. and *A. niger* and stemphylium sp. at 50 p.p.m. in the agar test plates, showing that the product is an effective fungicide.

The other esters listed in Table II also showed positive fungicidal actions.

(b) *In the control of rust and mildew.*—1-phenyl-2-chloroethyl trichloromethanesulfenate showed value in the control of rust and mildew, being 100% effective against rust at 1000 p.p.m. 1-phenyl-2-chloroethyl p-chlorobenzenesulfenate was also found to be effective in the control of mildew.

(c) *In control of the confused flour beetle.*—1-phenyl-2-chloroethyl trichloromethanesulfenate was also 100% effective in the control of *Tribolium confusum*, at a dilution of 0.06%, under test conditions.

(d) *Other uses.*—Besides their value as agricultural chemicals, the beta-substituted sulfenate esters (obtainable via Reaction 1) are of value for various other practical purposes. For example:

(1) The thioperoxides derived by reaction of epoxidized fish, vegetable, or animal oils are useful in small concentrations as additives in the finishing of papers to prevent attack by micro-organisms, and in paint formulations, especially in the preparation of coatings for marine uses.

(2) The beta-substituted thioperoxides obtained from 2,4-dinitrobenzenesulfenyl chloride or 2-nitro-4-chlorobenzenesulfenyl chloride are of value as modifiers and inhibitors of vinyl polymerizations. Because of the wide range of such thioperoxides available, and their abilities to act as "free-radical traps," as well as their individual tendencies to undergo scission into free radicals

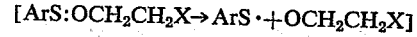

they may be used to generate such radicals in polymer formulations, providing means to inhibit and to modify the growth of the polymer chain from a vinyl type monomer.

(3) As synthetic intermediates: The sulfenate esters can be useful as the starting materials for the synthesis of other sulfenyl derivatives, or by oxidation for the synthesis of sulfinate esters and sulfonate esters. For example (Ar=2,4-dinitrophenyl):

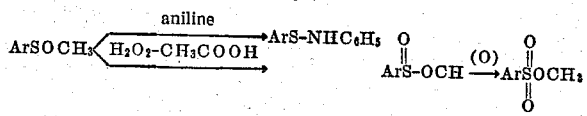

(4) As lubricating oil additives: The free-radical dissociation of the thioperoxides derived from trichloromethanesulfenyl chloride and other sulfenyl derivatives provides a type of behavior which by choice of the appropriate sulfenate, makes these useful as additives to lubricating oils.

(5) For improvement of ignition behaviors of diesel fuels: The free-radical dissociation of thioperoxides derived from trichloromethanesulfenyl chloride makes the beta-substituted thioperoxides of this type useful as substances to modify and improve the ignition behaviors of diesel fuels.

(6) As rubber chemicals: Our methods for the practical synthesis of a large variety of beta-substituted thioperoxides also provides a new group of substances which are of utility in the vulcanization of rubber and the manufacture of rubber products.

DIEPOXIDES

Thus far, we have considered only the cases where the sulfenyl derivative is as specified for Equation 1 and the epoxide is a mono-epoxide or a substituted monoepoxide, as—for example—epichlorohydrin. By using the technique of Example 1, we have also found that the reaction of a sulfenyl derivative and a diepoxide can be suitably controlled to yield distinct products, as illustrated in the following example, employing 2,4-dinitro-benzenesulfenyl chloride, butadiene diepoxide

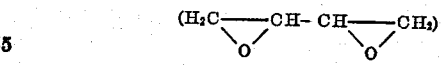

and pyridine as catalyst.

*Example 6.*—Into a 125 ml. glass-stoppered Erlenmeyer flask there was placed 3.52 g. (0.015 mole) of 2,4-dinitrobenzene-sulfenyl chloride (M.P. 95–97°) and 35 ml. of pure ethylene chloride was added. Butadiene diepoxide (caution: reported to be strongly carcinogenic), 1.29 g. (0.015 mole), was added and ten drops of pure dry pyridine were then added to the reaction mixture. The flask was stoppered and let stand 20 hours at room temperature, in the dark. It was noted, however, that immediately after adding the pyridine, a highly insoluble material formed. After 20 hours, the yellow solid was collected and washed with dry methylene chloride. By its characteristic appearance and decomposition temperature (290–300°) it was judged to be bis(2,4-dinitrophenyl) disulfide (0.8 g.). The yellow filtrate was chromatographed, using 80 g. of silica gel and methylene chloride as eluent. Final working up of the eluates led to two excellently crystalline products, one melting at 167–168° (dec.) and obtained only in 4.2% yield; and the other melting at 130–131° (dec.), in 27.7% yield, based on the sulfenyl chloride used. Although the structures of the products require final confirmation as to isomer possibilities, they are undoubtedly the result of reaction of one and two moles, respectively, with the dioxide, the latter product being obtained in lower yield in the present experiment. The most likely structures are those shown below:

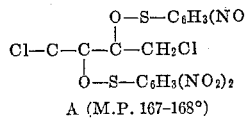
A (M.P. 167–168°)

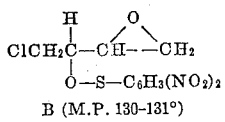
B (M.P. 130–131°)

*Analysis.*—Higher melting products; presumably of structure A: Calcd. for $C_{16}H_{12}O_{10}N_4S_2Cl_2$: C, 34.59; H, 2.16; N, 10.09. Found: C, 34.32; H, 2.02; N, 10.45. Found (independent analysis on different sample): C, 34.99; H, 2.24. The product was highly explosive under combustion conditions.

*Analysis.*—Lower melting isomer, probably of structure B: Calcd. $C_{10}H_9O_6N_2SCl$: C, 37.44; H, 2.81; N, 8.74; S, 9.98. Found: C, 37.24; H, 2.68; N, 8.91; S, 10.08.

*Example 7.*—The use of 4-chloro-2-nitrobenzenesulfenyl chloride as the sulfenyl chloride in the reaction with an epoxide is illustrated by the following: In a 50 ml., dry flask was placed 2.24 g. (0.01 mole) of 2-nitro-4-chlorobenzenesulfenyl chloride, 25 ml. of dry ethylene chloride, 0.125 mole of ethylene oxide, and 0.3 ml. of dry pyridine. The flask was stoppered and let stand, at room temperature in the dark, for one day. Completion of the reaction was indicated by a negative starch-iodide test for the sulfenyl chloride. The solvent was removed in vacuo and the residue recrystallized once from methylene chloride and then from 95% ethanol. After drying in the vacuum dessicator, the product melted at 99–100° C.

*Analysis.*—Calcd. for $C_8H_7NO_3SCl_2$: Cl, 26.44. Found: Cl, 26.72.

We claim:
1. Chemical compounds of the general formula $NO_2(X)C_6H_3SOCH(R'')CHCl$ wherein X is selected from the class consisting of $NO_2$, Cl and H, and R'' is selected from the class consisting of H, lower alkyl and phenyl.
2. Chemical compounds of the general formula

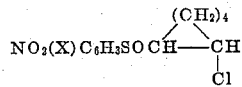

where X is selected from the class consisting of $NO_2$, Cl and H.
3. A mixture of compounds prepared by reacting butadiene diepoxide with 2,4-dinitrobenzenesulfenyl chloride in equimolar proportions in the presence of pyridine.
4. 2-chloroethyl 2,4-dinitrobenzenesulfenate.
5. 2-chloroethyl 2-nitro-4-chlorobenzenesulfenate.
6. 2-chlorocyclohexyl 2,4-dinitrobenzenesulfenate.
7. 1-chloro-2-propyl 2,4-dinitrobenzenesulfenate.
8. 2-chloro-2-phenylethyl 2,4-dinitrobenzenesulfenate.
9. A process for preparing a beta-substituted sulfenate ester comprising contacting a first reactant of the formula RSX where R is selected from the group consisting of trichloromethyl, nitro-substituted phenyl and nitro- and chloro-substituted phenyl and X is selected from the group consisting of chlorine, bromine, thiocyanate and $OCOCH_3$ with a second reactant selected from the group consisting of (a) compounds of the formula

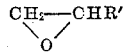

where R' is selected from the group consisting of H, lower alkyl and phenyl, (b) the epichlorohydrins corresponding to said class (a) compounds, (c) lower cycloaliphatic epoxides, (d) the epichlorohydrins of lower cycloaliphatic epoxides and (e) butadiene diepoxide.

10. The process of claim 9 wherein the first reactant is 2,4-dinitrobenzene-sulfenyl chloride, the second reactant is butadiene diepoxide and the second reactant is present relative to the first reactant in a 1:1 molar ratio.

11. A process for preparing a beta-substituted sulfenate ester comprising contacting in the presence of a tertiary amine catalyst selected from the group consisting of triethylamine, pyridine and lower alkyl-substituted pyridines a first reactant of the formula RSX where R is selected from the group consisting of trichloromethyl, nitro-substituted phenyl and nitro- and chloro-substituted phenyl and X is selected from the group consisting of chlorine, bromine, thiocyanate and $OCOCH_3$ with a second reactant selected from the group consisting of (a) compounds of the formula

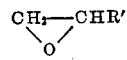

where R' is selected from the group consisting of H, lower alkyl and phenyl, (b) the epichlorohydrins corresponding to said class (a) compounds, (c) lower cycloaliphatic epoxides, (d) the epichlorohydrins of lower cycloaliphatic expoxides and (e) butadiene diepoxide.

12. A process for preparing a beta-substituted sulfenate ester comprising contacting in the presence of a 2-methyl-5-ethyl pyridine catalyst a first reactant of the formula RSX where R is selected from the group consisting of trichloromethyl, nitro-substituted phenyl and nitro- and chloro-substituted phenyl and X is selected from the group consisting of chlorine, bromine, thiocyanate and $OCOCH_3$ with a second reactant selected from the group consisting of (a) compounds of the formula

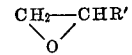

where R' is selected from the group consisting of H, lower alkyl and phenyl, (b) the epichlorohydrins corresponding to said class (a) compounds, (c) lower cycloaliphatic epoxides, (d) the epichlorohydrins of lower cycloaliphatic epoxides and (e) butadiene diepoxide.

13. A process for preparing a beta-substituted sulfenate ester comprising contacting in the presence of a tertiary amine catalyst selected from the group consisting of triethylamine, pyridine and lower alkyl-substituted pyridines, a first reactant of the formula

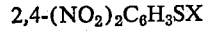
$2,4-(NO_2)_2C_6H_3SX$ where X is selected from the group consisting of chlorine, bromine, thiocyanate and $OCOCH_3$ with a second reactant selected from the group consisting of (a) compounds of the formula

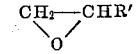

where R' is selected from the group consisting of H, lower alkyl and phenyl, (b) the epichlorohydrins corresponding to said class (a) compounds, (c) lower cycloaliphatic epoxides, (d) the epichlorohydrins of lower cycloaliphatic epoxides and (e) butadiene diepoxide.

14. A process for preparing a beta-substituted sulfenate ester comprising contacting in the presence of a tertiary amine catalyst selected from the group consisting of triethylamine, pyridine and lower alkyl-substituted pyridines, a first reactant of the formula RSX where R is selected from the group consisting of trichloromethyl, nitro-substituted phenyl and nitro- and chloro-substituted phenyl and X is selected from the group consisting of chlorine, bromine, thiocyanate and $OCOCH_3$ with ethylene oxide.

15. A process for preparing a beta-substituted sulfenate ester comprising contacting in the presence of a tertiary amine catalyst selected from the group consisting of triethylamine, pyridine and lower alkyl-substituted pyridines, a first reactant of the formula RSX where R is selected from the group consisting of trichloromethyl, nitro-substituted phenyl and nitro- and chloro-substituted phenyl and X is selected from the group consisting of chlorine, bromine, thiocyanate and $OCOCH_3$ with styrene oxide.

16. A process for preparing a beta-substituted sulfenate ester comprising contacting in the presence of a tertiary amine catalyst selected from the group consisting of triethylamine, pyridine and lower alkyl-substituted pyridines, a first reactant of the formula RSX where R is selected from the group consisting of trichloromethyl, nitro-substituted phenyl and nitro- and chloro-substituted phenyl and X is selected from the group consisting of chlorine, bromine, thiocyanate and $OCOCH_3$ with epichlorohydrin.

17. The process for preparing a beta-substituted sulfenate ester comprising contacting in the presence of a pyridine catalyst a first reactant of the formula RSX wherein R is selected from the group consisting of trichloromethyl, nitro-substituted phenyl and nitro- and chloro-substituted phenyl and X is selected from the group consisting of chlorine, bromine, thiocyanate and $OCOCH_3$ with butadiene diepoxide.

18. The process for preparing a beta-substituted sulfenate ester comprising contacting trichloromethane-sulfenyl chloride in the presence of a tertiary amine catalyst selected from the class consisting of triethylamine, pyridine and lower alkyl-substituted pyridines with a second reactant selected from the group consisting of (a) compounds of the formula

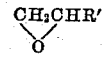

where R' is selected from the group consisting of H, lower alkyl and phenyl, (b) the epichlorhydrins corresponding to said class (a) compounds, (c) lower cycloaliphatic epoxides, (d) the epichlorohydrins of lower cycloaliphatic epoxides and (e) butadiene diepoxide.

References Cited in the file of this patent

Kharasch et al.: Chem. Reviews, vol. 39, pages 323–7 (1946).

Perold et al.: J.A.C.S., vol. 73, pages 2379–80 (1952).